O. J. NIENOW.
ANTISKIDDING DEVICE FOR VEHICLE WHEELS.
APPLICATION FILED FEB. 10, 1917.
1,256,033.  Patented Feb. 12, 1918.
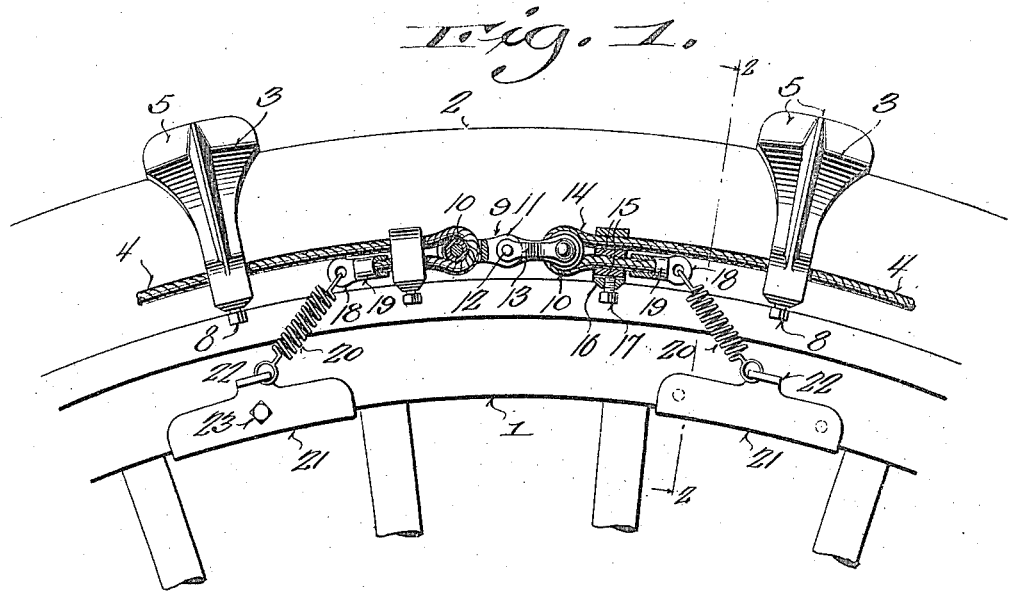
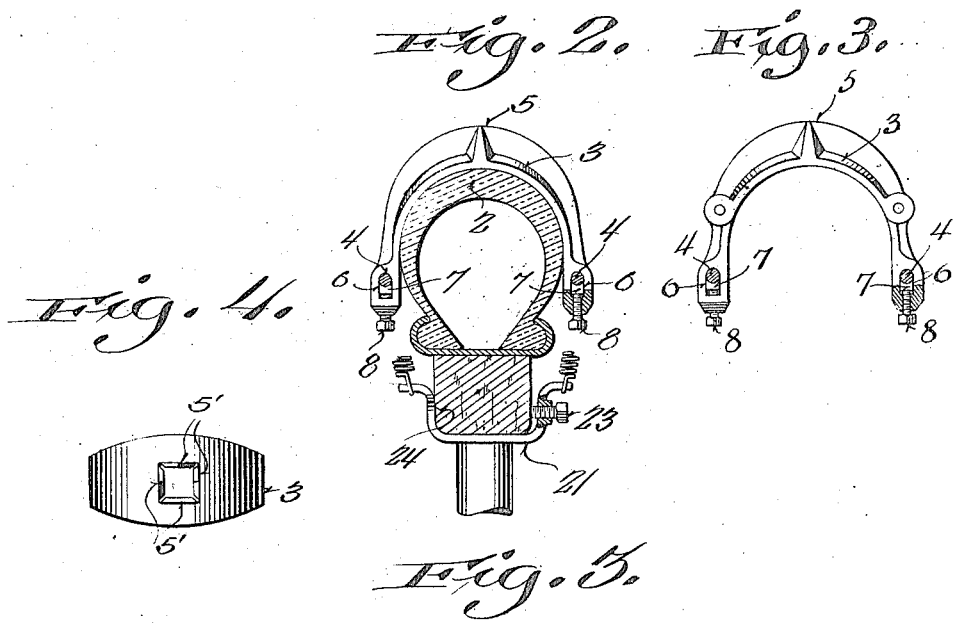

UNITED STATES PATENT OFFICE.

OTTO J. NIENOW, OF MERRILL, WISCONSIN.

ANTISKIDDING DEVICE FOR VEHICLE-WHEELS.

1,256,033.  Specification of Letters Patent. Patented Feb. 12, 1918.

Application filed February 10, 1917. Serial No. 147,869.

*To all whom it may concern:*

Be it known that I, OTTO J. NIENOW, a citizen of the United States, and resident of Merrill, in the county of Lincoln and State of Wisconsin, have invented certain new and useful Improvements in Antiskidding Devices for Vehicle-Wheels; and I do hereby declare that the following is a full, clear, and exact description thereof.

My invention relates to new and useful improvements in anti-skidding attachments for automobile wheels, the principal object being to provide a device of this character, which when applied, will be prevented from shifting circumferentially with respect to the tire, thereby preventing chafing of the latter.

An additional object is to provide a device of this character in which the circumferentially extending retaining members are adjustable for various sizes of tires.

Still another object is to provide means for quickly disengaging the retaining members so that the device may be quickly and easily removed from the tire.

With these and other objects in view the invention resides in certain novel features of construction, combination and arrangement of parts which will be hereinafter more specifically described and claimed.

In the drawing:

Figure 1 represents a side elevation of a fragment of an automobile wheel having a portion of the usual pneumatic tire disposed thereon, the latter being provided with an anti-skidding device constructed in accordance with my invention.

Fig. 2 is a vertical transverse section on the plane of the line 2—2 of Fig. 1.

Fig. 3 is a detail plan view of the means employed for holding the retaining members together.

Fig. 4 is a similar view of a modified form of tread plate which may be used in connection with the other parts of my invention.

Fig. 5 is a detail elevational view of a modified form of tread plate that may be used in connection with the other parts of my invention.

Referring now more particularly to the several figures of the drawing, it will be noted that the numeral 1 designates a portion of the felly of an automobile wheel having a pneumatic tire 2 disposed thereon, the invention being attached to the tire and to the felly. The device comprises broadly a plurality of transversely curved tread plates 3, a pair of circumferentially disposed retaining members 4 connecting the opposite ends of the tread plates, and means joining the retaining members with the felly 1 to prevent longitudinal shifting of the parts.

Any preferred form of tread plate may be used with the other parts of the device, in the present case two being illustrated. That form of plate shown in Fig. 1 has a pair of ribs 5 projecting from its outer surface, one of the ribs extending transversely of the tire and the other longitudinally thereof. The anti-skidding portions of the other form of tread plate which is shown in Fig. 4 are formed by striking a number of prongs 5' from the center of the plate.

Each end of each tread plate is provided with an elongated aperture 6 through which the retaining members 4 slide, said members in the present instance being in the form of wire cables. The tread plates are preferably adjustable on the cables 4 so that they may be disposed at any desired points around the tire 2, and when once adjusted are held by the blocks 7, the same being forced tightly against the cables by the set screws 8.

In order that the device may be readily placed around the tire 2, a two part catch member 9 is disposed between the ends of each of the cables 4, each of said catch members being formed of two parts, one of which is carried by each end of the cable. To easily adjust the cables, the end portions thereof are trained around pulleys 10, which are formed on the opposite end of a two-part catch member 9. One of the pulleys is carried by each part of the catch member, the same being provided with arms to receive these pulleys therebetween and through which pins extend to hold the latter in position. This arrangement in effect produces a connector having openings through its opposite ends which act as guides for the ends of the cables. One part of each catch member 9 carries an apertured ear 11, while the cooperating part has a stud 12 for engagement with said ear, the studs being disposed in the apertures thereof when the cables are in operative position. A leaf spring 13 is pivoted to one part of each catch member and is adapted to engage the end of the stud 12 to effectively hold the parts together.

After each end of each cable 4 has been passed around its adjacent pulley 10 it is bent upon itself as shown at 14 and is held by clamping blocks 15 positioned within a clamping yoke 16 as clearly illustrated in Fig. 1. Two of the clamping blocks 15 are preferably used in each of the clamping yokes and are arranged in any suitable manner to most effectively hold the end portions of the cable when the set screws 17 are tightened. By this arrangement each of the cables 4 may be adjusted from either or both ends merely by loosening the set screws 17 and pulling in opposite directions on the free ends of the cable. This arrangement permits the device to be used on various sizes of vehicle tires without the addition of any other parts than those shown in the drawings.

The principal object of the invention being to hold the device against longitudinal shifting with respect to the tire 2, each free end of each cable 4 is provided with an eye 18, said eyes being formed on the ends of sockets 19 which receive and are soldered to the ends of said cables after the same have been disposed around the pulleys. Resilient links 20 are adapted to connect each eye 18 with the felly 1. U-shaped attaching plates 21 are secured to the felly 1 and have ears 22 formed on each arm thereof to receive one end of the resilient links 20, the latter being preferably in the form of the contracting coil springs shown. Fig. 2 clearly shows the application of the U-shaped attaching plates 21 to the felly 1, and in this figure it will be noted that each plate is held in position by means of one or more set screws 23 which are threaded in one arm. When these set screws 23 are tightened they force the prongs 24 into the wood of the felly, thus holding the plates against both longitudinal and transverse movement.

By providing the coil springs 20 for connecting the ends of the cables 4 and the ears of the attaching plates, it is obvious that the cables will be prevented from any excessive longitudinal movement relative to the tire 2 regardless of the length of the former. Furthermore since the attaching plates may be positioned at any desired points upon the felly the proper amount of tension may be placed upon the springs 20 and thereby wholly prevent movement of the tread plates and cables or allow slight movement thereof, if such is ever necessary.

From this description taken in connection with the accompanying drawing, it is obvious that a very simply constructed anti-skidding device has been provided and one which will overcome the usual difficulties experienced by the shifting of the parts about the tire.

What is claimed is:

1. The combination with a vehicle wheel, of a plurality of tread members to be disposed around the tire thereof, a circumferentially extending retaining member connecting the ends of said tread members, a connector having an opening through one end, said connector being carried by one end portion of the retaining-member, the other end portion of said member being slidable through the opening in said connector, and a connection between the free end of the last mentioned end portion of the retaining member and the vehicle wheel.

2. The combination with a vehicle wheel, of a plurality of tread members to be disposed around the tire thereof, a circumferentially extending retaining member connecting the ends of said tread members, a connector having an opening through the end, said connector being carried by one end portion of the retaining member, the other end portion of said member being slidable through the opening in said connector, and a contractile spring connecting the last mentioned end portion of the retaining member and the vehicle wheel.

3. The combination with a vehicle wheel, of a plurality of tread members to be disposed around the tire thereof, a circumferentially extending retaining member connecting the ends of said tread members, a connector having an opening through each end, each end portion of the retaining member being slidable through one of said openings in the connector, and a connection joining the free end of each end portion of the retaining member with the wheel to prevent longitudinal shifting of the tread members and retaining member relative to the tire of said wheel.

4. The combination with a vehicle wheel, of a plurality of tread members to be disposed around a tire thereof, a circumferentially extending retaining member connecting the ends of said tread members, a catch member having a pulley carried by each end, the end portions of the retaining member being trained around said pulleys, and means connecting each end portion to the wheel to prevent longitudinal shifting of the tread members and retaining member relative to the tire of said wheel.

5. The combination with a vehicle wheel, of a plurality of tread members to be disposed around a tire thereof, a circumferentially extending retaining member connecting said tread members, a two-part catch, a pulley carried by each part of said catch, the end portions of the retaining member being trained around said pulleys, and means connecting each end portion of the retaining member with the wheel to prevent longitudinal shifting of the tread members and retaining member relative to the tire of said wheel.

In testimony that I claim the foregoing I have hereunto set my hand at Milwaukee, in the county of Milwaukee and State of Wisconsin.

OTTO J. NIENOW.